United States Patent
Nakamura (10) Patent No.: US 6,747,592 B2
(45) Date of Patent: Jun. 8, 2004

(54) RADAR SYSTEM FOR DETECTING RELATIVE VELOCITY AND RELATIVE SPEED OF A PRECEDING VEHICLE

(75) Inventor: Kazuto Nakamura, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/436,176

(22) Filed: May 13, 2003

(65) Prior Publication Data

US 2003/0210174 A1 Nov. 13, 2003

(30) Foreign Application Priority Data

May 13, 2002 (JP) ..................................... 2002-136412

(51) Int. Cl.$^7$ ............................................... G01S 7/34
(52) U.S. Cl. ............................ 342/70; 342/71; 342/72; 342/91
(58) Field of Search ............................... 342/70, 71, 72, 342/89, 90, 91, 92, 104, 109, 111, 112, 115, 129, 162, 192, 195, 196

(56) References Cited

U.S. PATENT DOCUMENTS

| | | | | |
|---|---|---|---|---|
| 6,018,309 A | * | 1/2000 | Mitsumoto et al. | 342/109 |
| 6,229,474 B1 | * | 5/2001 | Uehara | 342/70 |
| 6,608,587 B1 | * | 8/2003 | Sparrow et al. | 342/188 |
| 6,611,225 B2 | * | 8/2003 | Mitsumoto et al. | 342/70 |

| | | | | |
|---|---|---|---|---|
| 2002/0080062 A1 | * | 6/2002 | Aker et al. | 342/114 |

FOREIGN PATENT DOCUMENTS

JP S49-107491 10/1974

* cited by examiner

Primary Examiner—Thomas H. Tarcza
Assistant Examiner—Isam Alsomiri
(74) Attorney, Agent, or Firm—Crowell & Moring LLP (57) ABSTRACT

A diplex Doppler type radar system which can detect a preceding vehicle even when the range rate (e.g. a relative velocity, a relative distance) of a preceding vehicle relative to a vehicle having the radar system is small. A Radar system is mounted on a vehicle, the transmit antenna alternately transmits two signals on different frequencies. When the transmitted signals met an object (a preceding vehicle) and reflected, the reflected signals are received by a receive antenna. Usually, The first A/D converter digitizes IF signals (said received signals) and the DSP (digital signal processor) frequency-analyzes the digitized signals to compute the range rate of the preceding vehicle. When a peak spectrum exists in a low frequency range below a preset threshold as the result of the frequency analysis, the IF signals are digitized by the second A/D converter which has a higher sampling resolution than that of the second A/D converter. The digitized IF signals are frequency-analyzed by the system control microcomputer 115. Thus the range rate (e.g. a relative velocity and a relative distance between the preceding vehicle and the following vehicle) of the preceding vehicle is computed.

6 Claims, 8 Drawing Sheets

RADAR SYSTEM FOR DETECTING RELATIVE VELOCITY AND RELATIVE SPEED OF A PRECEDING VEHICLE

BACKGROUND OF THE INVENTION

1. Field of the Invention

The present invention relates to a radar system mounted on a vehicle for measuring a range rate, e.g. a relative velocity and a relative distance between the vehicle and a preceding vehicle, obstacle etc.

2. Description of Related Art

A radio radar using millimeter waves and other waves has been used for air-traffic control, meteorological observation because of low propagation loss and great propagation distance even in bad weathers, e.g. rains, fogs. Thanks to these merits, in collision prevention and safety fields of automobiles, a millimeter wave radar to measure a vehicular gap (relative distance; car-to-car distance) and a relative vehicle velocity between a preceding vehicle and the following vehicle (the vehicle with the radar system) is being researched, developed and commercialized these days. A radar system of a diplex Doppler type is disclosed as a typical one of radar modulation systems in Japanese Application Patent Laid-open Publication No. Sho 49-107491.

Figure 7:
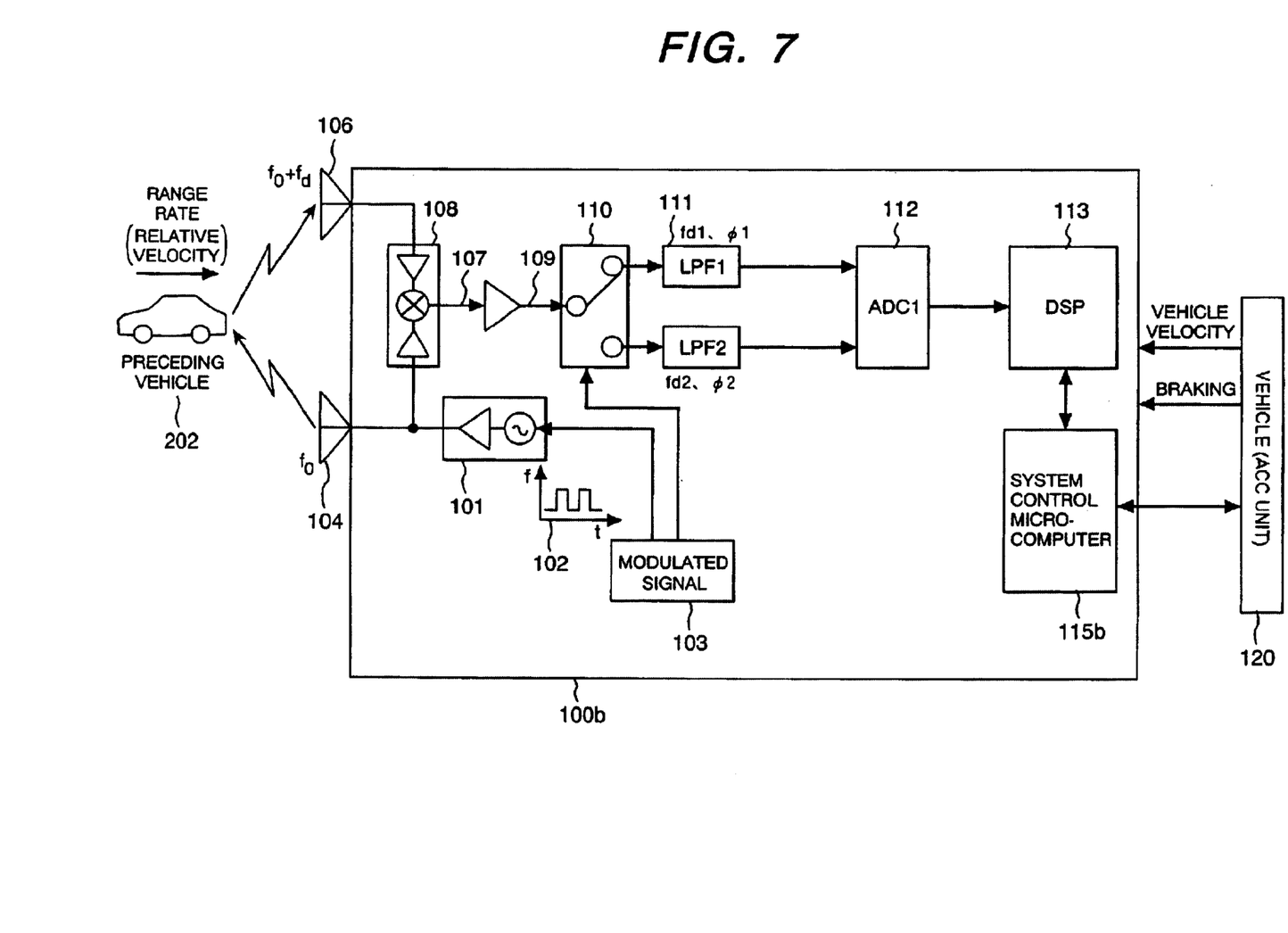
FIG. 7 is a circuit block diagram of a conventional millimeter wave radar system.

Referring to FIG. 7, this radar system modulates a signal output from a millimeter wave oscillator 101 into two time-sharing signals on frequencies $f_1$ and $f_2$ (the difference $\Delta f$: $f_2 - f_1$) by a modulation signal 102 from a modulator 103. These signals are transmitted by a transmit antenna 104 and reflect back when they meet a preceding vehicle 202, and then they are received by a receive antenna 106.

When there is some range rate (relative velocity) V between the preceding vehicle 202 and the millimeter wave radar system 100b of the following vehicle, Doppler frequencies $fd_1$ and $fd_2$ are caused in the reflected signals. As the result, the signals received by the receive antenna 106 have frequencies $f_1 + fd_2$ and $f_2 + fd_2$. A mixer 108 turns these signals into time-shared signals (or intermediate frequency signals 107 hereinafter abbreviated as IF signals) respectively containing information of Doppler frequencies $fd_1$ and $fd_2$. The IF signals 107 are amplified by an amplifier 109 and distributed to two low-pass filters (LPFs) 111 and 111 by a switch 110 which works in synchronism with the modulation signal 102.

Figure 8:
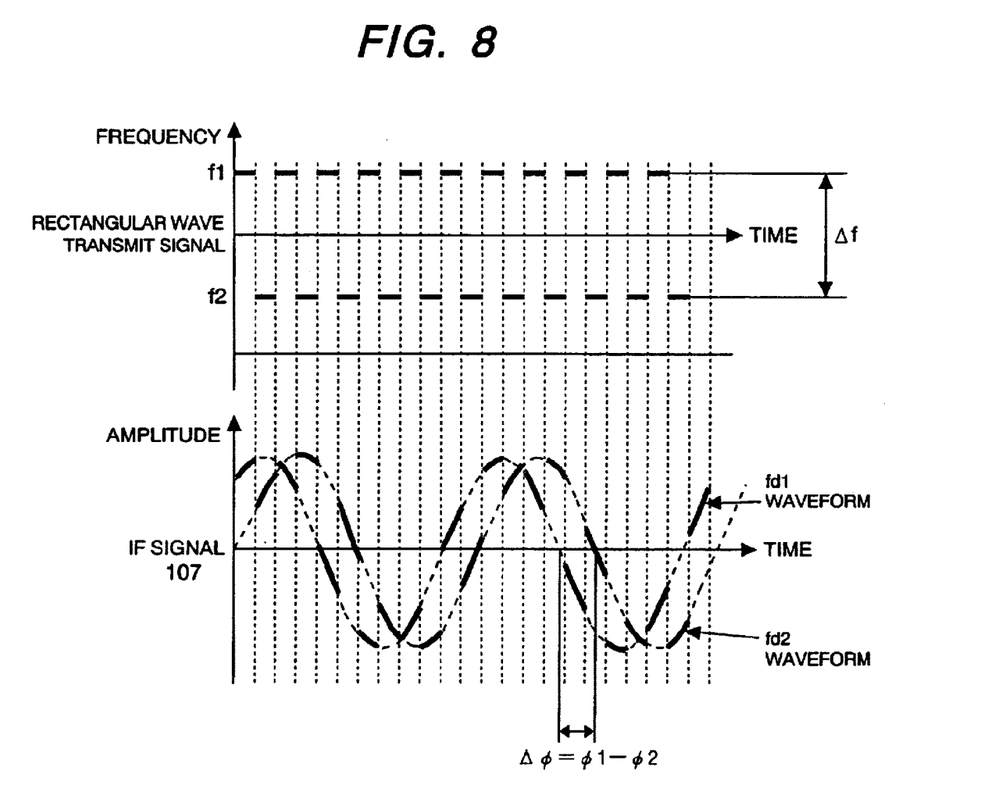
FIG. 8 is an explanatory drawing of a relationship between a diplex Doppler type transmit signal and an IF signal.

Referring to FIG. 8, a relationship between transmit signals and IF signals 107 is explained below. Transmit signals consist of two time-sharing signals on frequencies $f_1$ and $f_2$. When the IF signals 107 pass through the mixer 108, frequency components $f_1$ and $f_2$ of the transmit signals are removed from the received signal and the IF signals 107 respectively become signals containing information of Doppler frequencies. As already described above, the switch 110 works in synchronism with the modulation signal 102 to distribute the IF signals 107 containing information of Doppler frequencies $fd_1$ and $fd_2$ into a signal of Doppler frequency $fd_1$ and a signal of Doppler frequency $fd_2$.

These Doppler signals are digitized by an A/D converter 112, and transformed (analyzed) with FFT (Fast Fourier Transform) by a DSP (digital signal processor) 113b. With the FFT analysis, Doppler frequencies $fd_1$, $fd_2$ and the phase differences $\phi_1$, $\phi_2$ are obtained. The relative velocity V between the preceding vehicle 202 and the following vehicle (the vehicle having this radar system) is expressed by equation (1) or (2) below.

$$V = (C \times fd_1)/(2 \times f_1) \quad (1)$$

or $$V = (C \times fd_2)/(2 \times f_2) \quad (2)$$

wherein

C is a signal ray (propagation) velocity.

Let's assume that $fd_1 \ll f_1$, $fd_2 \ll f_2$, and $\Delta f \ll f_1$. In this case, $fd_1$ can be approximately equal to $fd_2$ and the relative velocity V can be expressed by equation (3) below.

$$V \approx (C \times fd_1)/(2 \times f_0) \quad (3)$$

wherein $$f_0 = (f_1 + f_2)/2$$

The relative distance R (range) between two cars can be expressed by equation (4) below.

$$R = C \times (\phi_1 - \phi_2)/(4\pi \times \Delta f) \quad (4)$$

After computing the relative velocity V and the relative distance (vehicular gap; car-to-car distance) R, the DSP (digital signal processor) 113b send them to ACC (adaptive cruise control) unit 120 of the vehicle through a system microcomputer 115b.

Figure 2:
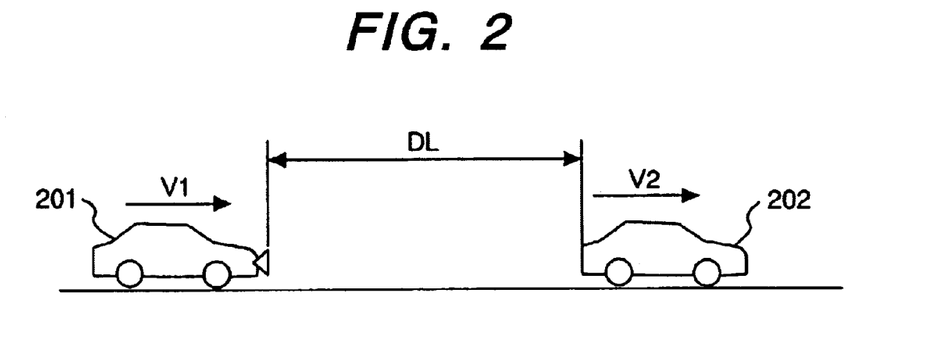
FIG. 2 is an explanatory drawing of the positional relationship between a vehicle having the radar system and a vehicle running before it.
Figure 3:
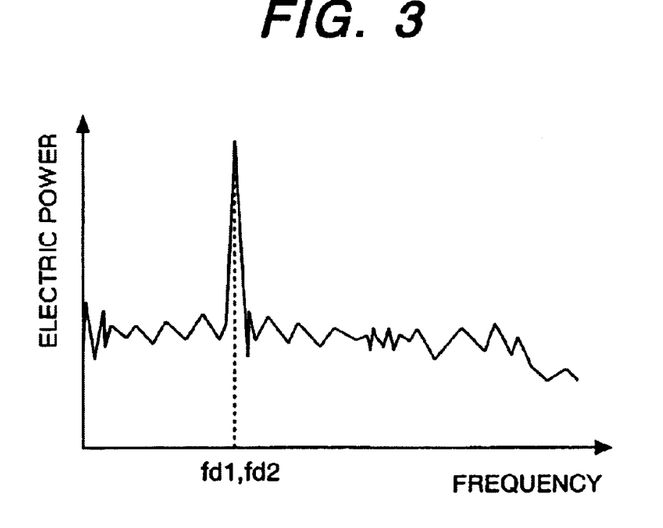
FIG. 3 is an explanatory drawing of a frequency spectrum of a Doppler signal when the velocity of a preceding vehicle relative to the vehicle having the radar system is above a threshold

For example, as shown in FIG. 2, let assume that a preceding vehicle 202 runs before a vehicle 201 with this radar system, these velocities are respectively V1 and V2, namely the relative velocity is (V1–V2), and the frequencies of Doppler signals are $fd_1$ and $fd_2$. FIG. 3 shows the result of the FFT analysis of the signals. In FIG. 3, a peak spectrum appears at the Doppler frequencies $fd_1$ and $fd_2$ on the Frequency axis. The relative velocity (V1–V2) and the relative distance R (DL in FIG. 2) between the preceding vehicle 202 and the following vehicle 201 can be obtained from this frequency information and the phase information as it is mentioned above.

This diplex Doppler type signal processing enables stable detection of a preceding vehicle without any complicated signal processing because it detects a spectrum corresponding to a preceding vehicle from the result of FFT analysis and we can get a relative velocity from the frequency information and a relative distance from the phase information simultaneously.

The above prior art has problems listed below.

Figure 9:
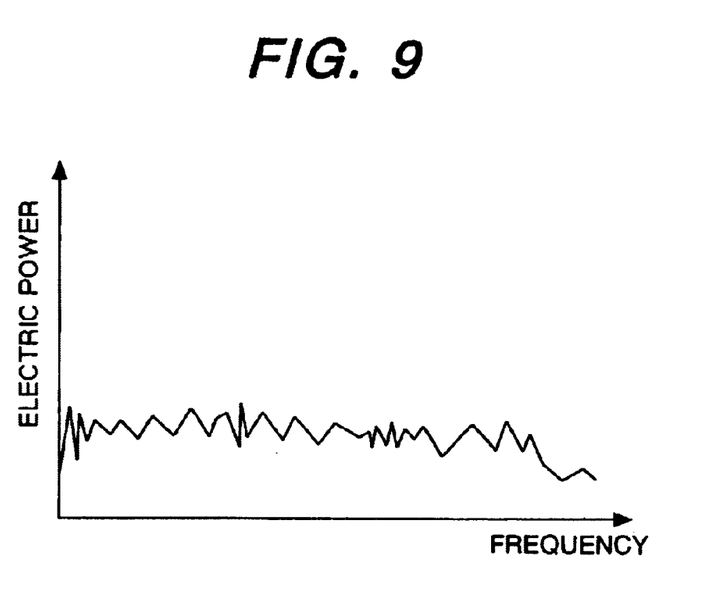
FIG. 9 is an explanatory drawing of a frequency spectrum of a Doppler signal when the velocity of a preceding vehicle relative to the vehicle having the radar system is below a threshold.

For example, if the difference between the velocity V1 of a vehicle 201 and the velocity V2 of a preceding vehicle 202 as described referring to FIG. 2, that is, a relative velocity (V1–V2) is almost close to 0 and smaller than a minimum relative velocity that can be analyzed by the FFT, the frequency fd of the Doppler signal of the preceding vehicle 202 does not appear in the result of the FFT analysis as indicated in FIG. 9.

In other words, if the relative velocity of the preceding vehicle 202 to the following vehicle 201 is very small, there is a problem that this radar system cannot detect (catch) a preceding vehicle.

SUMMARY OF THE INVENTION

The present invention has been created considering the above problems, and the object of the present invention is to provide a radar system which can detect a preceding vehicle (object) even when the range rate of the preceding vehicle relative to the vehicle equipped with this system is very small.

To accomplish the aforesaid object, the present invention is characterized by a radar system comprising a transmit antenna for alternately transmitting two signals on different frequencies, a receive antenna for receiving signals which were transmitted from said transmit antenna and reflected back on the preceding object (e.g. vehicle, obstacle) when they met an object, a first digitizing means for sampling and digitizing respectively said received signals, and a first analyzing means for analyzing the frequencies of said digitized receive signals, extracting a peak spectrum, and computing a range rate of said object from the frequency of said peak spectrum;

wherein said radar system further comprises a second digitizing means for sampling and digitizing respectively said received signals, a second analyzing means for analyzing the frequencies of said receive signals digitized by said second analyzing means, extracting a peak spectrum, and computing a range rate of said object from the frequency of said peak spectrum, and an output means for outputting selectively either the range rate computed by said first analyzing means or the range rate computed by said second analyzing means; said first analyzing means stores, as a threshold, a frequency which is within an analyzable low frequency range and higher than a minimum analyzable frequency; said second digitizing means samples and digitizes said received signals at a higher sampling resolution than the sampling resolution of said first digitizing means so that said second analyzing means may be able to analyze frequencies below said threshold; and said first analyzing means causes said second digitizing means and said second analyzing means to work when said received signals have a peak spectrum below said threshold.

In case that there is a single object before the vehicle having this radar system, when the second digitizing means and the second analyzing means work, the output means outputs the range rate of the preceding object (a relative velocity and a relative distance between 2 cars etc.) which is computed by the second analyzing means. When the second digitizing means and the second analyzing means do not work, the output means outputs the range rate of the object which is computed by the first analyzing means. In other words, when there is only one preceding object before the vehicle having this radar system, the output means selectively outputs either the range rate computed by the first analyzing means or the range rate computed by the second analyzing means. In case that there are two or more objects, for example, when the second digitizing means and the second analyzing means work for one of the objects, the output means outputs the range rate of the object which is computed by the second analyzing means. When the second digitizing means and the second analyzing means do not work for the other objects, the output means outputs the range rate of the object which is computed by the first analyzing means. In other words, when two or more objects are before the vehicle having this system, the output means can output both the range rate by the first analyzing means and the range rate by the second analyzing means.

The above radar system can be equipped with a variable-gain amplifying means for amplifying the received signals and a means for setting a gain of the amplifying means before the received signals is fed to the first digitizing means and/or the second digitizing means.

The above radar system can be also characterized in that said second analyzing means analyzes the frequencies of said received signals, extracts a peak spectrum, checks whether the frequency of the peak spectrum is below said threshold, and temporarily stores the effect when the frequency of the peak spectrum is below said threshold; and said first analyzing means, at next cycle after the frequency analysis of said received signals by said second analyzing means, analyzes the frequencies of said received signals, as a result even when there is no frequency of the peak spectrum below said threshold, said first analyzing means causes said second digitizing means and said second analyzing means to work if said second analyzing means stores the effect that the frequency of the peak spectrum is below said threshold.

DESCRIPTION OF THE PREFERRED EMBODIMENT

Preferred embodiments of the present invention are described below with reference to the accompanying drawings.

Figure 1:
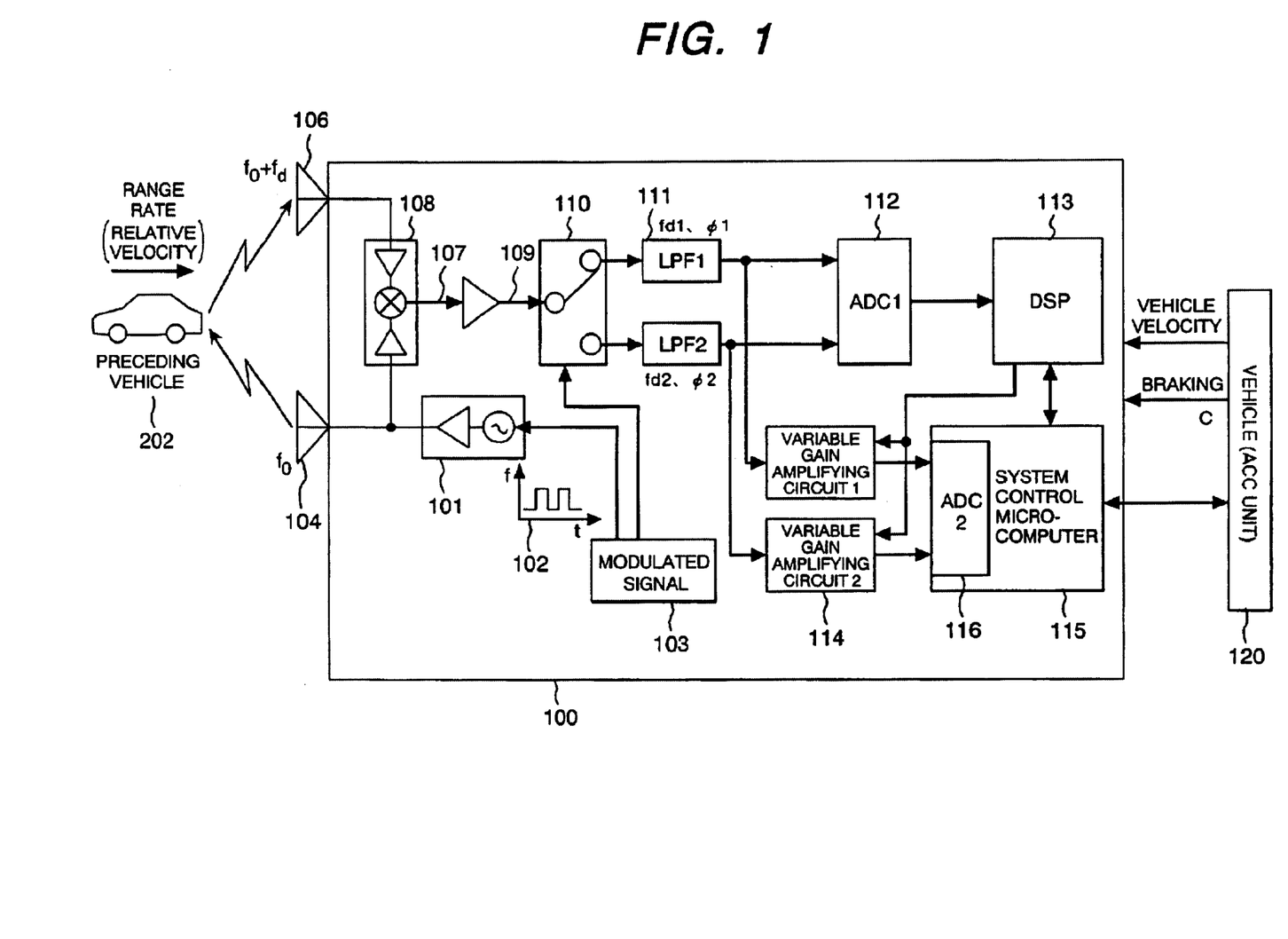
FIG. 1 is a circuit block diagram of a millimeter wave radar system which is an embodiment of the present invention.

Referring to FIG. 1, the millimeter wave radar system 100 which is an embodiment of the present invention comprises a modulator 103 for generating a modulation signal 102, a millimeter wave oscillator 101 for generating transmit signals of two frequencies $f_1$ and $f_2$ ($\Delta f = f_2 - f_1$) by a modulation signal 102 coming from the modulator 103, a transmit antenna 104 for transmitting signals from the millimeter wave oscillator 101, a receive antenna 106 for receiving signals which are reflected back on a preceding vehicle 202, a mixer 108 for mixing the received signals with the transmit signals generated by the millimeter wave oscillator 101, an amplifier 109 for amplifying IF signals 107 sent from the mixer 108, a switch 110 for dividing the amplified IF signals in synchronism with the modulation signal 102, low pass filters (LPF) 111, 111 for removing high-frequency components respectively from signals which are divided by the switch 110, an analog/digital converter (first digitizing means) 112 for converting analog signals sent from the LPFs 111, 111 into digital signals, a DSP (digital signal processor: first analyzing means) 113 for frequency-analyzing the signal output from the analog/digital converter 112 and computing the range rate of the preceding vehicle (e.g. a relative velocity and a relative distance between the preceding vehicle 202 and the vehicle (the following vehicle) 201 with the radar system), variable-gain amplifying circuits 114, 114 for amplifying the outputs of the LPFs 111, 111, and a system control microcomputer (a second analyzing means) 115 for frequency-analyzing the signals output from the variable-gain amplifying circuits 114, 114 and computing the relative velocity and others between the preceding vehicle 202 and the vehicle 201.

The DSP 113 stores a threshold $fd_{th}$ which is used to check whether a frequency-analysis by the microcomputer 115 is required after a frequency-analysis by the DSP 113.

Figure 4:
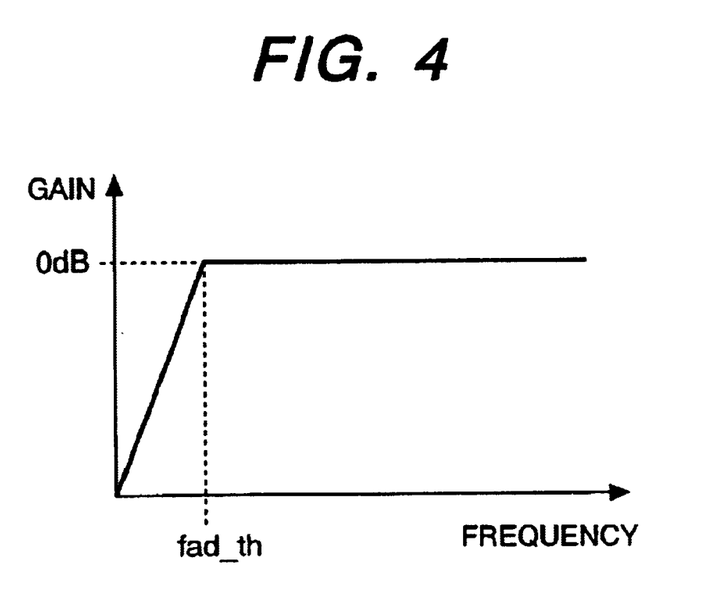
FIG. 4 is an explanatory drawing of the frequency characteristic of the A/D converter.

This threshold $fd_{th}$ is within a low frequency range which the DSP 113 can analyze in the frequency-analysis and higher than a minimum frequency analyzable. It is defined by either of the following two factors:

The first factor is a frequency characteristic of the analog/digital converter 112. As shown in FIG. 4, the analog/digital converter 112 has a characteristic that, when the frequency is $fad_{th}$ or less, the gain falls below 0 dB and the converter does not let the signal pass through. When an ordinary inexpensive audio A/D converter which is generally used is used as the analog/digital converter 112, the A/D converter neither passes nor digitizes a signal whose frequency is lower than the low frequency range $fad_{th}$. Therefore, no spectrum appears in the low frequency range below $fad_{th}$ even when the DSP 113 performs the FFT analysis on the signal.

The second factor is the lowest frequency $fft_{th}$ that can be analyzed by the DSP 113. For example, let's assume that the sampling frequency to be digitized by the A/D converter 112 is Fs and the number of FFT points is N, the minimum frequency $fft_{th}$ that can be analyzed by the DSP 113 is expressed by the following equation.

$$fft_{th}=Fs/N$$

As described above, the lowest frequency of a digital signal output from the A/D converter 112 that can be analyzed by the DSP 113 is the higher one among the minimum frequency $fad_{th}$ that can be digitized by the A/D converter 112 and the minimum frequency $fft_{th}$ that can be frequency-analyzed by the DSP 113.

In order to take a margin, the threshold $fd_{th}$ is set 2 times the lowest frequency of a digital signal output from the A/D converter 112 that can be analyzed by the DSP 113, that is, 2 times the higher one among $fad_{th}$ and $fft_{th}$. However, the threshold $fd_{th}$ need not always be 2 times the higher one among $fad_{th}$ and $fft_{th}$. It can be 1.5 to 3.0 times the higher one among $fad_{th}$ and $fft_{th}$.

The system control microcomputer 115 (as a second analyzing means and an output means) is equipped with an A/D converter 116 (as a second digitizing means) to convert analog signals sent from the variable-gain amplifying circuits 114, 114 into digital signals.

As the system control microcomputer 115 performs frequency-analysis on frequency range below the threshold $fd_{th}$, according to the sampling theorem, the sampling frequency $Fs_{1w}$ of the A/D converter 116 is better at 2 times threshold $fd_{th}$, as shown in the following equation (5).

$$Fs_{1w}=2\times fd_{th} \qquad (5)$$

The number of FFT points $N_{1w}$ for FFT analysis by the system control microcomputer 115 is determined by equation (6) when the FFT analysis processing needs value of fres as a resolution. The value of fres must be smaller than the value of $fd_{th}$ as the purpose of this FFT analysis is to analyze frequencies below $fd_{th}$.

$$N_{1w}=2\times fd_{th}/fres \qquad (6)$$

In brief, in the A/D converter 116 of the microcomputer 115 for system control, the sampling frequency $Fs_{1w}$ is $2\times fd_{th}$ lower than the sampling frequency of the A/D converter 112, the sampling resolution is fres higher than the sampling resolution of the A/D converter 112, and the number of FFT points $N_{1w}$ is $2\times fd_{th}/fres$.

Below will be described the operation of the millimeter wave radar system which is an embodiment of the present invention.

The modulator 103 sends a modulation signal 102 to the millimeter wave oscillator 101 and the switch 110. The millimeter wave oscillator 101 receives the modulation signal 102 and alternately outputs signals of two different frequencies $f_1$ and $f_2$ ($\Delta f=f_2-f_1$). These signals (from the millimeter wave oscillator 101) are outputted as transmit signals from the transmit antenna 104, reflected upon a preceding vehicle 202, and received by the receive antenna 106. When there is a relative velocity V between the preceding vehicle 202 and the millimeter wave radar system 100 (of the following car), the signals received by the receive antenna 106 contain Doppler frequencies $fd_1$ and $fd_2$. In other words, the receive signals are a combination of signals of frequencies $f_1+fd_1$ and a signal of frequencies $f_2+fd_2$. The mixer 108 removes the frequency components $f_1$ and $f_2$ from the received signals and outputs IF signals 107 containing information of the Doppler frequencies $fd_1$ and $fd_2$. Then the IF signals are amplified by the amplifier 109, divided into a signal of the Doppler frequency $fd_1$ and a signal of the Doppler frequency $fd_2$ by a switch 110 in synchronism with a modulation signal 102, and sent to the low pass filters 111, 111. The IF signals passing through the low pass filters 111, 111 are digitized by the A/D converter 112 and then sent to the DSP 113.

Figure 5:
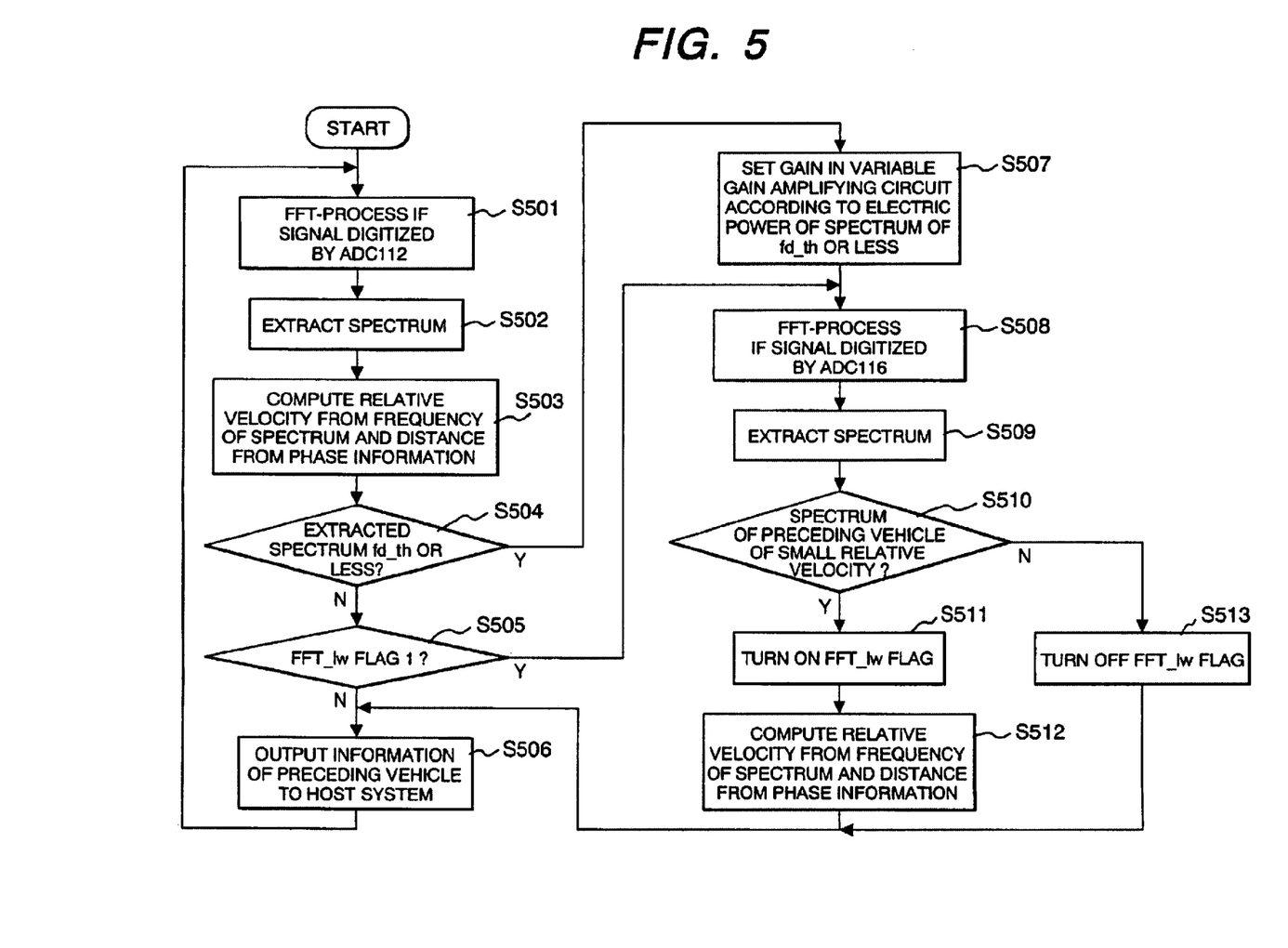
FIG. 5 is a flow chart indicating the operation of the millimeter wave radar system which is an embodiment of the present invention.

The operations of the DSP 113 and microcomputer 115 for the system control will be described below referring to FIG. 5.

The DSP 113 performs a FFT analysis to the IF signals digitized by the A/D converter 112 (Step 501), extracts a peak spectrum from the spectrum characteristic which is the result of the FFT analysis (Step 502), computes a relative velocity V from the frequency of the peak spectrum, and computes a relative distance (car-to-car distance etc.) from the phase difference information between Doppler frequencies $fd_1$ and $fd_2$.(Step 503).

To put it concretely, when Doppler frequencies $fd_1$ and $fd_2$ and the phases $\phi_1$, $\phi_2$ are obtained in the FFT analysis, as already described in the prior art, the relative velocity V is computed by equation (1) or (2) and the relative distance R is computed by equation (4).

$$V=(C\times fd_1)/(2\times f_1) \qquad (1)$$

$$V=(C\times fd_2)/(2\times f_2) \qquad (2)$$

Wherein C is a ray velocity (signal propagation velocity).

$$R=C\times(\phi_1-\phi_2)/(4\pi\times\Delta f) \qquad (4)$$

Wherein $\Delta f$ is $f_2-f_1$.

When the relative velocity and the relative distance are computed (Step 503), the DSP 113 checks whether a peak spectrum exists in a frequency range below the threshold $fd_{th}$ (Step 504). When a peak spectrum exists in the range, the processing proceeds to Step 507. When no peak spectrum exists in the range, the DSP 113 checks whether the $FFT_{1w}$ flag (to be explained later) in the system control microcomputer 115 is 1 (Step 505). When the $FFT_{1w}$ flag is 1, the processing proceeds to Step 508. When the $FFT_{1w}$ flag is not 1, that is, the flag is 0, the relative velocity and the relative distance computed at Step 503 are sent to the system control microcomputer 115. When receiving these, the system control microcomputer 115 passes them to the on-vehicle unit 120 (ACC unit) (Step 506).

When recognizing that a peak spectrum exists in a frequency range below the threshold $fd_{th}$ at Step 504, the DSP 113 sets a gain of each variable gain amplifying circuit 114, 114 according to the power of the peak spectrum (Step 507). To put it concretely, the gain is decreased when the power of the peak spectrum is great, and the gain is increased when the power of the peak spectrum is small.

When gains are set, the variable gain amplifying circuit 114, 114 respectively output the amplified IF signals to the A/D converter 116 in the system control microcomputer 115 and digitized there. The output of the A/D converter is FFT-analyzed by the system control microcomputer 115 (Step 508). In this FFT analysis, the sampling frequency $Fs_{1w}$ of the A/D converter 116 is $2 \times fd_{th}$ (Equation (5)). The sampling resolution is fres and the number of FFT points $N_{1w}$ is $2 \times fd_{th}/fres$. With these, frequency components below the threshold frequency $fd_{th}$ can be detected.

Next, the system control microcomputer 115 extracts a peak spectrum from the spectrum characteristic obtained by the FFT analysis (Step 509) and checks whether there is a preceding vehicle having a small relative velocity before the radar system (the following car), that is, whether there is a peak spectrum in the frequency range below the threshold $fd_{th}$ (Step 510). The system control microcomputer 115 turns on (=1) the $FFT_{1w}$ flag (Step 511) when recognizing that there is a preceding vehicle having a small relative velocity before the radar system, and turns off (=0) the $FFT_{1w}$ flag (Step 513) when recognizing that there is not so.

The $FFT_{1w}$ flag is used to indicate that there is no peak spectrum in a frequency range above the threshold $fd_{th}$ and that there may be a peak spectrum in a frequency range below the threshold $fd_{th}$ and above a greater one of $fad_{th}$ and $fft_{th}$. Therefore, when the system control microcomputer 115 that performs a FFT analysis on a signal in a low frequency range below the threshold $fd_{th}$ judges that there is no vehicle having a small relative velocity before the radar system at Step 510, that is, there is no peak spectrum in the frequency range below the threshold $fd_{th}$, it is assumed that there is a peak spectrum in a frequency range higher than the threshold $fd_{th}$, that is, there is no peak spectrum that can be processed by the system control microcomputer 115. Therefore, the $FFT_{1w}$ flag is turned off (=0) at Step 513. In this case, the processing proceeds to Step 506, and the relative velocity and other data obtained at Step 503 are sent to the vehicle unit 120. When the system control microcomputer 115 judges that there is a vehicle having a small relative velocity before the radar system at Step 510, that is, there is a peak spectrum in the frequency range below the threshold $fd_{th}$, the $FFT_{1w}$ flag is turned on (=1) at Step 511. In this case, the processing proceeds to Step 512. At Step 512, the system control microcomputer 115 computes the relative velocity from the frequency of the peak spectrum which was extracted at Step 509, computes the relative distance (car-to-car distance etc.) from the phase information, and sends these to the vehicle unit 120 (Step 506).

When it is judged that there is no peak spectrum in the frequency range below the threshold $fd_{th}$ at Step 504, the processing proceeds to Step 505. At step 505, when it is judged that the $FFT_{1w}$ flag is on (=1), the DSP 113 judges that the system control microcomputer 115 may be able to extract a peak spectrum although the DSP 113 cannot extract a peak spectrum in the frequency range below the threshold $fd_{th}$. And the processing proceeds to Step 508. At Step 508, the system control microcomputer 115 digitizes and FFT-analyzes inputted signals. In this case, the variable-gain amplifying circuits 114, 114 use the gains that have been set by the preceding routine.

As described above, this embodiment can also analyze low-frequency components among frequency components of IF signals 107. Therefore, even when the range rate V of a preceding vehicle 202 relative to the vehicle 201 having this radar system is small, the radar system can detect the preceding vehicle 202, and can obtain the relative velocity V and the relative distance R between two cars by analyzing the frequencies of IF signals 107.

By the way, the FFT analysis by the system control microcomputer 115 is greatly different from the FFT analysis by the DSP 113 in the following: The processing interval of the FFT analysis by the system control microcomputer 115 can be comparatively long because the relative velocity of the preceding vehicle is so small and there may be little possibility of collision. And the threshold $fd_{th}$ suffices as an upper limit of frequency to be analyzed by the microcomputer 115. Therefore since the signal processing load of the FFT analysis of the system control microcomputer 115 is extremely smaller than that of the FFT analysis of the DSP 113, the microcomputer 115 can be an inexpensive general-purpose microcomputer instead of an exclusive processor which performs arithmetic operations at a high speed.

The performance required of the A/D converter 116 is different from the performance required of the A/D converter 112 in the following. The A/D converter 116 unlike the A/D converter 112 is allowed to dedicate to A/D conversion of signals in a limited low frequency range only. Therefore, the A/D converter 116 can be low in the processing speed and narrow in the dynamic range. Consequently, the A/D converter 116 can be a general purpose A/D converter used in a general-purpose microcomputer.

As described above, this embodiment uses a system control microcomputer 115 equipped with an A/D converter 116 in stead of the conventional system control microcomputer 115b (see FIG. 7) to analyze a velocity V of a preceding vehicle 202 relative to a vehicle 201 having the radar system even the velocity V is small. Therefore, any conventional general-purpose microcomputer can be used as the system control microcomputer 115 and it is possible to suppress the production cost of the radar system from increasing.

In the above embodiment, the amplifying circuits 114 are provided only before the system control microcomputer 115, but it is not intended as a definition of the limits of the present invention. The amplifying circuits can be provided also before the DSP 113. Further, judging from the relationship between the dynamic range of the A/D converter 116 and the dynamic range of the target IF signal, the amplifying circuits can be omitted if the dynamic range of the A/D converter 116 is enough.

Figure 6:
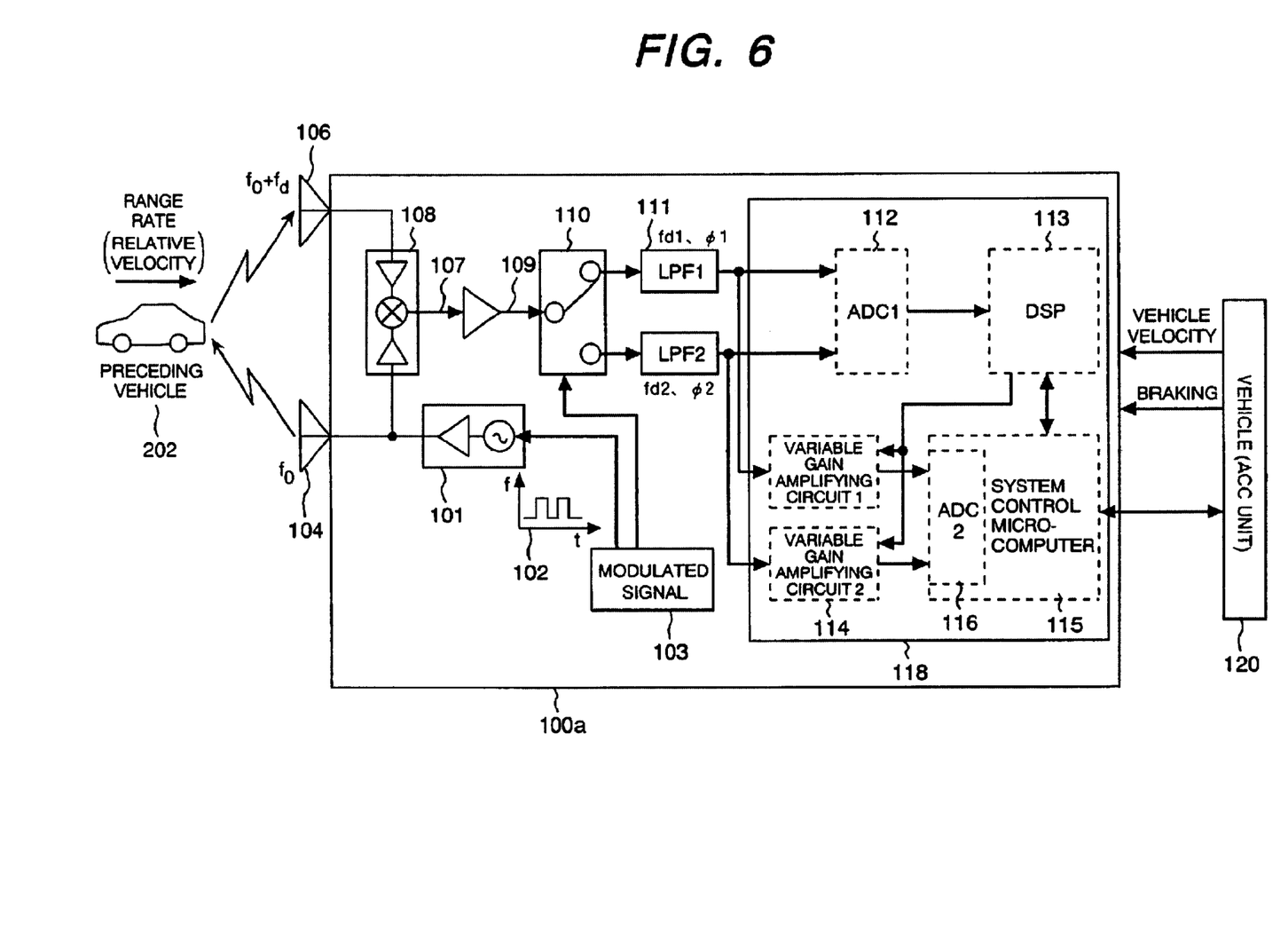
FIG. 6 is a circuit block diagram of a millimeter wave radar system which is another embodiment of the present invention.

Further the A/D converter 112, the DSP 113, the variable gain amplifying circuits 114, and the system control microcomputer 115 are independent of each other in the above embodiment, but they can be integrated in a single dedicated IC chip 118 as shown in FIG. 6 to simplify its installation.

(Industrial Applicability)

As the radar system of the present invention can also analyze low-frequency components of received signals, the radar system can detect a preceding vehicle and measure its relative velocity and other data by the frequency analysis of the received signals even when the relative velocity of the preceding vehicle is small.

What is claimed is:

1. A radar system comprising a transmit antenna for alternately transmitting two signals on different frequencies, a receive antenna for receiving signals which were transmitted from said transmit antenna and reflected back on a preceding object, a first digitizing means for sampling and digitizing respectively said received signals, and a first analyzing means for analyzing the frequencies of said digitized receive signals, extracting a peak spectrum, and computing a range rate of said object from the frequency of said peak spectrum;

wherein said radar system further comprises a second digitizing means for sampling and digitizing respectively said received signals, a second analyzing means for analyzing the frequencies of said receive signals digitized by said second digitizing means, extracting a peak spectrum, and computing a range rate of said object from the frequency of said peak spectrum, and an output means for outputting selectively either the range rate computed by said first analyzing means or the range rate computed by said second analyzing means; said first analyzing means stores, as a threshold, a frequency which is within an analyzable low frequency range and higher than a minimum analyzable frequency; said second digitizing means samples and digitizes said received signals at a higher sampling resolution than the sampling resolution of said first digitizing means so that said second analyzing means may be able to analyze frequencies below said threshold; and said first analyzing means causes said second digitizing means and said second analyzing means to work when said received signals have a peak spectrum below said threshold.

2. A radar system of claim 1, wherein said radar system comprising an amplifying means which amplifies said received signals at an optional gain before said received signals go into said first or second digitizing means, and a gain setting means for setting a gain of said amplifying means.

3. A radar system of claim 1, wherein said radar system comprising an amplifying means which amplifies said received signals at an optional gain before said received signals go into said second digitizing means, and a gain setting means for setting a gain of said amplifying means according to the magnitude of said peak spectrum extracted by frequency analysis of said first analyzing means.

4. A radar system of claim 1, wherein said second analyzing means analyzes the frequencies of said received signals, extracts a peak spectrum, checks whether the frequency of the peak spectrum is below said threshold, and temporarily stores the effect when the frequency of the peak spectrum is below said threshold; and said first analyzing means, at next cycle after the frequency analysis of said received signals by said second analyzing means, analyzes the frequencies of said received signals, as a result even when there is no frequency of the peak spectrum below said threshold, said first analyzing means causes said second digitizing means and said second analyzing means to work if said second analyzing means stores the effect that the frequency of the peak spectrum is below said threshold.

5. A radar system of claim 1, wherein said threshold is 1.5 to 3.0 times of the higher one among the minimum frequency which can be digitized by said first digitizing means and the minimum frequency which can be analyzed by said first analyzing means, whichever is greater.

6. A radar system of claim 1, wherein the frequency sampled by said second digitizing means is two times the frequency of said threshold.

* * * * *